United States Patent
Shetty et al.

(10) Patent No.: US 10,545,518 B2
(45) Date of Patent: *Jan. 28, 2020

(54) SYSTEM AND METHOD FOR OPTIMAL LOAD AND SOURCE SCHEDULING IN CONTEXT AWARE HOMES

(71) Applicant: Ademco Inc., Golden Valley, MN (US)

(72) Inventors: Pradeep Shetty, Bangalore (IN); Wendy Foslien Graber, Woodbury, MN (US); Purnaprajna R. Mangsuli, Bangalore (IN); Soumitri N. Kolavennu, Blaine, MN (US); Keith L. Curtner, St. Paul, MN (US)

(73) Assignee: Ademco Inc., Golden Valley, MN (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/839,556

(22) Filed: Dec. 12, 2017

(65) Prior Publication Data

US 2018/0101185 A1 Apr. 12, 2018

Related U.S. Application Data

(63) Continuation of application No. 13/323,451, filed on Dec. 12, 2011, now Pat. No. 9,874,885.

(51) Int. Cl.
*G05D 23/19* (2006.01)
*H02J 13/00* (2006.01)
(Continued)

(52) U.S. Cl.
CPC ..... *G05D 23/1923* (2013.01); *G05D 23/1924* (2013.01); *H02J 3/382* (2013.01); *H02J 13/0079* (2013.01); *H04L 12/2827* (2013.01); *H02J 2003/003* (2013.01); *H02J 2003/007* (2013.01); *H04L 12/2823* (2013.01);
(Continued)

(58) Field of Classification Search
CPC ............ G05D 23/1923; G05D 23/1924; H02J 2003/007; H02J 2003/003; H02J 3/382; H02J 13/0079; H04L 12/2823; H04L 12/2827; Y02E 40/72; Y02E 60/76; Y04S 20/244; Y04S 10/123; Y04S 10/54;
(Continued)

(56) References Cited

U.S. PATENT DOCUMENTS 7,130,719 B2   10/2006   Ehlers et al.
7,469,550 B2   12/2008   Chapman, Jr. et al.
(Continued)

OTHER PUBLICATIONS

"U.S. Appl. No. 13/323,451, Final Office Action dated Sep. 11, 2014", 27 pgs.
(Continued)

*Primary Examiner* — Robert E Fennema
*Assistant Examiner* — Jigneshkumar C Patel
(74) *Attorney, Agent, or Firm* — Shumaker & Sieffert, P.A.

(57) ABSTRACT

A controller for controlling energy consumption in a home includes a constraints engine to define variables for multiple appliances in the home corresponding to various home modes and persona of an occupant of the home. A modeling engine models multiple paths of energy utilization of the multiple appliances to place the home into a desired state from a current context. An optimal scheduler receives the multiple paths of energy utilization and generates a schedule as a function of the multiple paths and a selected persona to place the home in a desired state.

20 Claims, 10 Drawing Sheets

(51) Int. Cl.
*H02J 3/38* (2006.01)
*H04L 12/28* (2006.01)
*H02J 3/00* (2006.01)

(52) U.S. Cl.
CPC ......... *Y02B 70/325* (2013.01); *Y02B 70/3275* (2013.01); *Y02E 40/72* (2013.01); *Y02E 60/76* (2013.01); *Y04S 10/123* (2013.01); *Y04S 10/54* (2013.01); *Y04S 20/228* (2013.01); *Y04S 20/244* (2013.01); *Y04S 40/22* (2013.01)

(58) Field of Classification Search
CPC ..... Y04S 20/228; Y04S 40/22; Y02B 70/325; Y02B 70/3275
USPC ....................................................... 700/276
See application file for complete search history.

(56) References Cited

U.S. PATENT DOCUMENTS

| | | |
|---|---|---|
| 7,639,907 B2 | 12/2009 | Elberbaum |
| 2007/0154319 A1 | 7/2007 | Stiles et al. |
| 2008/0183307 A1 | 7/2008 | Clayton et al. |
| 2009/0195349 A1 | 8/2009 | Frader-thompson et al. |
| 2010/0211224 A1 | 8/2010 | Keeling et al. |
| 2011/0046805 A1 | 2/2011 | Bedros et al. |
| 2013/0030732 A1 | 1/2013 | Shetty et al. |
| 2013/0151012 A1 | 6/2013 | Shetty et al. |

OTHER PUBLICATIONS

"U.S. Appl. No. 13/323,451, Final Office Action dated Sep. 21, 2015", 36 pgs.
"U.S. Appl. No. 13/323,451, Non Final Office Action dated Jan. 20, 2017", 25 pgs.
"U.S. Appl. No. 13/323,451, Non Final Office Action dated Apr. 23, 2015", 33 pgs.
"U.S. Appl. No. 13/323,451, Non Final Office Action dated Apr. 25, 2014", 19 pgs.
"U.S. Appl. No. 13/323,451, Non Final Office Action dated May 12, 2017", 25 pgs.
"U.S. Appl. No. 13/323,451, Notice of Allowance dated Sep. 26, 2017", 7 pgs.
"U.S. Appl. No. 13/323,451, Preliminary Amendment flied Jan. 15, 2013", 3 pgs.
"U.S. Appl. No. 13/323,451, Respnse filed Mar. 16, 2017 to Non Final Office Action dated Jan. 2017", 9 pgs.
"U.S. Appl. No. 13/323,451, Response filed Mar. 11, 2015 to Final Office Action dated Sep. 11, 2014", 10 pgs.
"U.S. Appl. No. 13/323,451, Response filed Jul. 14, 2014 to Non Final Office Action dated Apr. 25, 2014", 13 pgs.
"U.S. Appl. No. 13/323,451, Response filed Jul. 23, 2015 to Non Final Office Action dated Apr. 23, 2015", 8 pgs.
"U.S. Appl. No. 13/323,451, Response filed Dec. 7, 2015 to Final Office Action dated Sep. 21, 2015", 9 pgs.
"U.S. Appl. No. 13/323,451, Response flied Dec. 11, 2014 to Final Office Action dated Sep. 11, 2014", 7 pgs.
"U.S. Appl. No. 13/323,451, Response filed Aug. 10, 2017 to Non Final Office Action dated May 12, 2017", 8 pgs.

SYSTEM AND METHOD FOR OPTIMAL LOAD AND SOURCE SCHEDULING IN CONTEXT AWARE HOMES

RELATED APPLICATIONS

This application is a continuation of and claims priority to U.S. application Ser. No. 13/323,451, which was filed on Dec. 12, 2011, the contents of which are incorporated herein by reference.

GOVERNMENT FUNDING

This invention was made with Government support under Grant Number DE-EE0003840 awarded by the Department of Energy. The United States Government has certain rights in the invention.

BACKGROUND

Thermostats have been controlling heating and cooling for homes for many years. Many thermostats provide for the ability to set different times for different desired temperatures. Night settings allowed people to have their thermostat lower room temperatures for winter nights, while raising the temperature during daytime hours. Similarly, thermostats may allow homes to become warmer on weekdays while occupants are away at work, then automatically cooling the home for hours when the home is occupied.

SUMMARY

A controller for controlling energy consumption in a home includes a constraints engine to define variables for multiple appliances in the home corresponding to various home modes and persona of an occupant of the home. A modeling engine models multiple paths of energy utilization of the multiple appliances to place the home into a desired state from a current context. An optimal scheduler receives the multiple paths of energy utilization and generate a schedule as a function of the multiple paths and a selected persona to place the home in a desired state.

A method controls energy consumption in a home by modeling multiple paths of energy utilization of multiple appliances via a specifically programmed computer to place a home in a desired state from a current context, wherein the appliances have variables selected as a function of home modes and home occupant persona, receiving the multiple paths of energy utilization via the computer, and generating a schedule via the computer for control of the appliances as a function of the multiple paths and a selected persona to place the home in a desired state.

The method may be encoded on a computer readable storage device and executed by a computer in further embodiments.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In one embodiment, scheduling functionality of a controller such as a thermostat is extended to control multitude energy consuming loads in homes, such as lighting system, appliances, pool pump, pool heaters, motors and pumps etc. The controller performs multiple roles including monitoring, analyzing, planning and scheduling of the loads, thus transforming itself into a home energy manager. The controller in one embodiment, correlates and map non-crisp/fuzzy concepts like 'user persona', 'comfort preferences', 'user daily routine' and 'life style' to controllable and crisp parameters which is used for scheduling and controlling operation of home loads.

Figure 1:
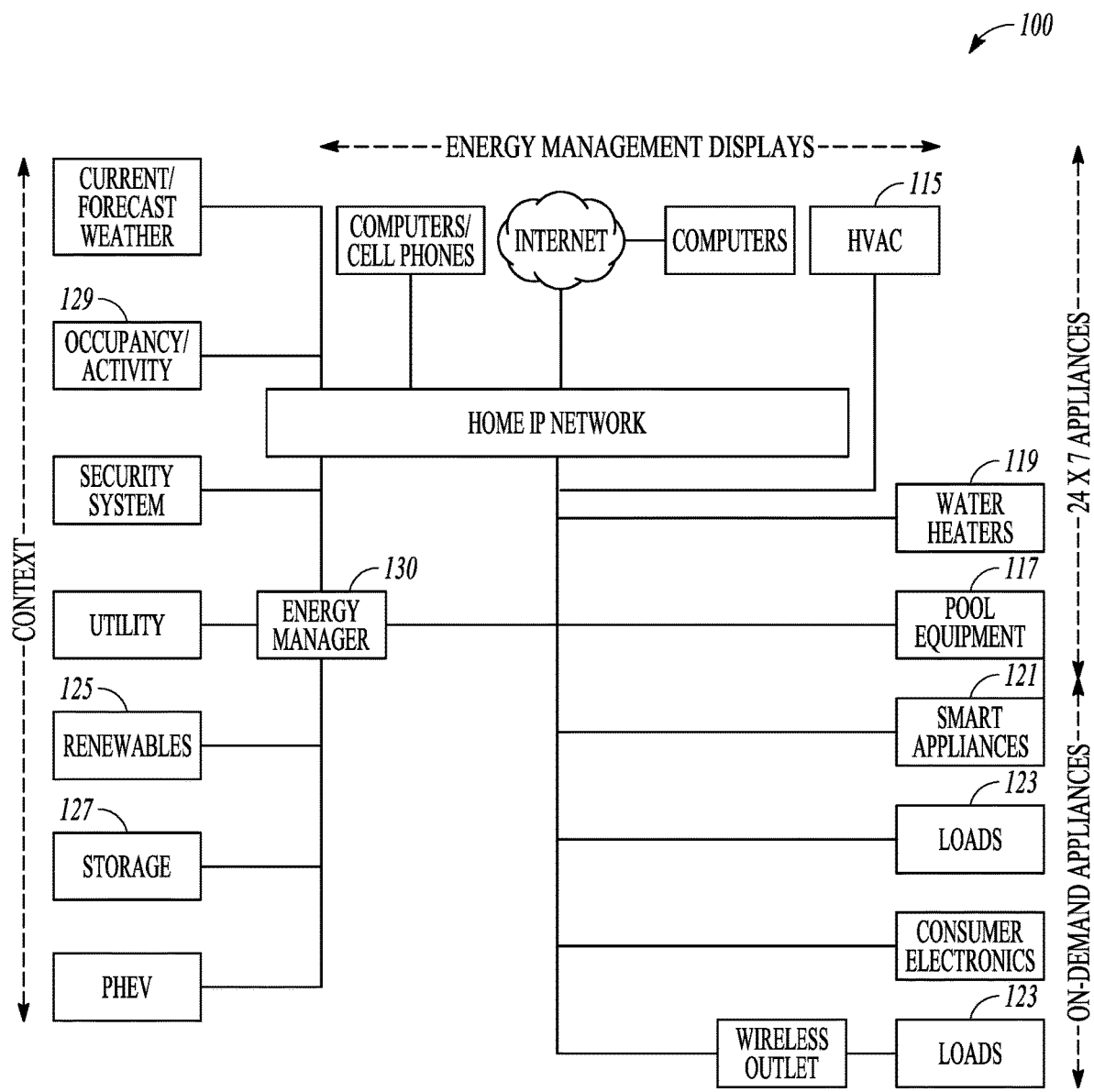
FIG. 1 is a block diagram of a system 100 for controlling appliances and systems in a home according to an example embodiment.

A context aware home system shown generally at 100 in FIG. 1 integrates heating ventilation and air condition (HVAC) 115, pool equipment 117, water heaters 119, and some or all appliances 121 and loads 123, and controls them. The context aware home also integrates generation 125, storage 127 and sensors 129 at various levels. An energy manager referred to as a controller 130 controls the generation, storage and load scheduling activity. The overall system 100 operates to keep occupants' comfort, dollar savings, and energy conservation in mind. The integration of multiple sub-systems makes the entire system 100 intelligent, which was otherwise not possible with independently operating appliances and equipment. This is due to the fact that, the context aware home monitors the context or conditions prevailing in the home, which is unavailable for individual equipment and appliances.

In one embodiment, the controller 130 includes an optimal scheduler as an integral part of the context aware home controlling the loads and sources depending on the contexts arising in the home. The optimal scheduler is an intelligent system which correlates the contexts in the home, load conditions, user preferences, utility needs and then arrives at a decision which satisfies the constraints existing in the eco-system.

Figure 2:
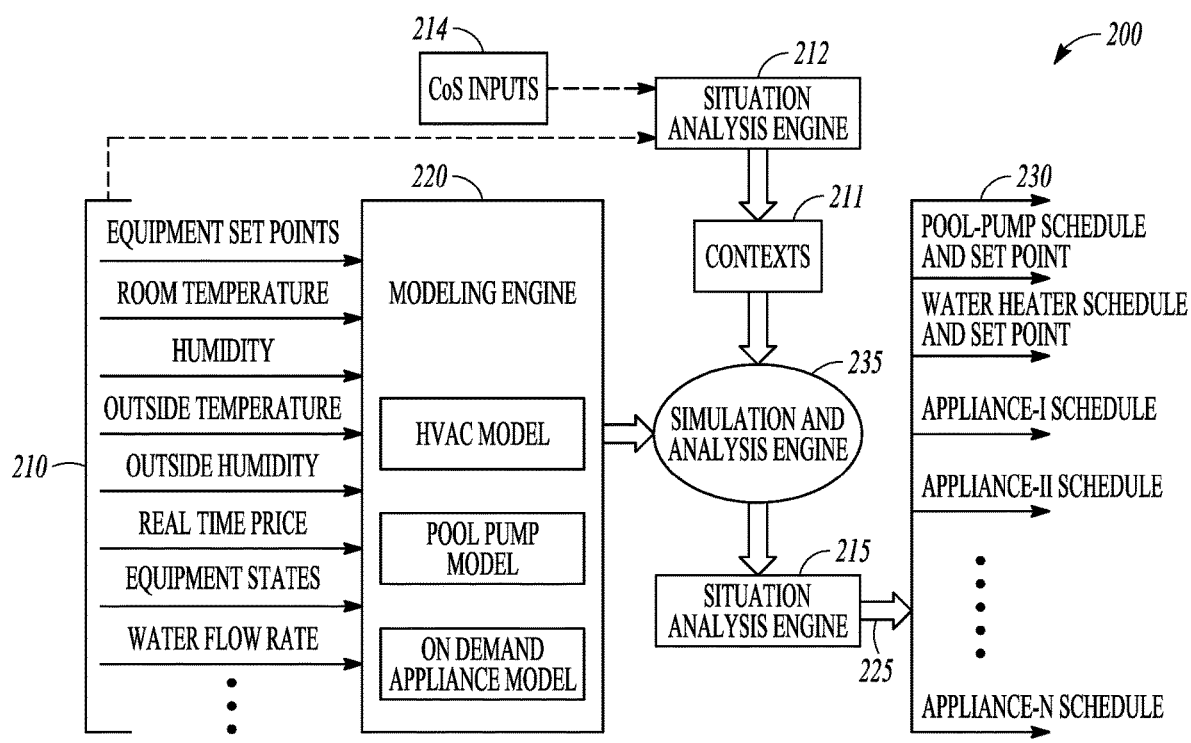
FIG. 2 is a block flow diagram of a load scheduling system for a home according to an example embodiment.

FIG. 2 is a block diagram of one embodiment 200 illustrating a load scheduling function of the controller 130. The controller is coupled to receive a set of measurement and parameters 210 (such as weather, occupancy, user modes) which affect or define a context of the home. Context 210 is generated by a situation analysis engine 212 from the measurements 210 and cost of service inputs 214 describes a setting or a situation that impacts the energy consumption of an appliance and the usage of generated energy from the distributed resources. Awareness of the context with respect to the family or the home environment can be used to significantly reduce energy consumption without compromising the home owner's convenience. There are three major conditions which affect the context namely: Operational conditions, Energy Supply type/Cost conditions and Environmental conditions.

Operational conditions: These are mainly driven by the user occupancy and can be summarized by short and long term schedule. According to the user schedule, different user modes may be derived as a function of time (In, Vacation, At the Office, Sleeping, Party, etc).

Environmental conditions: This context type is typically related to the current and predicted weather conditions around the home. If the current and forecasted weather are known, some appliances such as heating, cooling, and ventilation can potentially utilize different strategies. Also, weather information such as sunny or windy conditions can affect the renewable energy supply.

Energy supply type and/or cost conditions: This information is used for the integration and management of renewable sources. It is related to the reliability of the current and predicted energy supply from the available sources of energy. It also includes the different utility signals such as demand response (DR), real-time-pricing (RTP) information, and time-of-use (TOU) tariff.

These three types of context 211 will dictate different modes of operations and schedule for some of the home appliances. The initial operational context extraction related to homeowner activity or schedule is straightforward and has been used in programmable thermostats. However, the challenge is the accurate extraction of the entire context and the continuous update of the "real" schedule, without the need to deploy and configure many sensors. The static schedule can be enhanced by making use of more accurate context extraction that is related to the user's activity. Two approaches are typically used to assess context information: direct sensing measurements and indirect, inferred by integrating information from multiple sensors.

The set of measurements 210 are used to assess the conditions and contexts 211 prevailing at home by situation analysis engine 212. Measurements may include for example, total energy consumption, equipment set points, ambient conditions, Load states (ON/OFF) and operating modes, demand response and time of use price signal, predicted loads etc. An optimal load scheduler 215 uses the present state and expected state of the sources and loads in the future. A modeling engine 220 receives the measurements 210 and provides extensive modeling of the sources and loads. Many different load modeling techniques may be used, and one is described below. The optimal scheduler 215 relies on existing contexts at the home for executing a set of control actions 225 at any given point in time to control devices 230. In one embodiment, the optimal scheduler may consider the predicted state at the home as provided by a simulation and analysis engine 235, and accordingly schedule the appliances and equipment, keeping in mind the energy conservation and dollar savings.

One aspect of context is the occupancy of the home. In one embodiment, the control system 130 adaptively detects the occupancy at home based on occupancy sensors and schedules the HVAC, lighting, pool cleaning and heating equipments etc based on detected occupancy. In another embodiment, the control system indirectly infers the occupancy in the home based on the energy meter data, an indoor air quality sensor data, security system data etc., and then takes appropriate actions.

The system 200 takes in to account multiple inputs (both discrete and continuous) from various sensors operating at home. It also, takes into account the demand response signals from utility for arriving at optimal schedules. The system also takes the existing and predicted contexts in the home into account before scheduling the home appliances. The contexts are deduced from operational conditions, user preferences, weather conditions etc.

Figure 3:
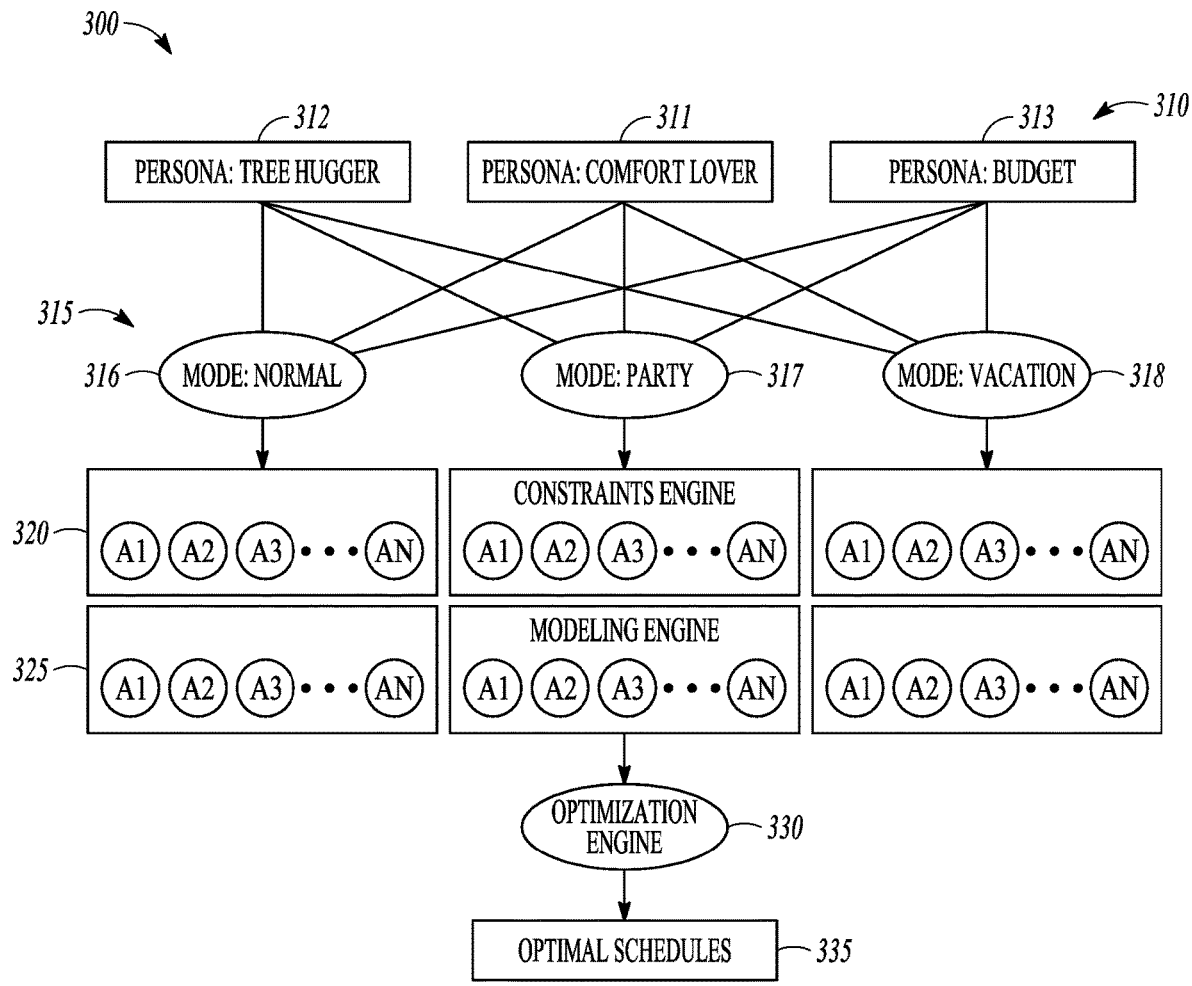
FIG. 3 is a block flow diagram of an optimal scheduler according to an example embodiment.

FIG. 3 is a block diagram of the optimal scheduler 300 operating in controller 130. The optimal scheduler is a hierarchical structure that includes multiple levels to capture the interaction of various sub-systems in an ecosystem such as a home user with a corresponding convenience of service, cost of operation, load condition, and energy source constraints amongst others. The optimal scheduler considers all of these interactions before controlling and scheduling the electrical load and electrical source sub-systems.

The context aware optimal scheduler 300 optimally plans and executes control of the electrical loads and sources at home. In one embodiment, the context aware optimal scheduler acts as an advisory system for the home owner, wherein it suggests various load schedules and set points for optimal energy conservation, dollar saving and comfort conditions. It also, inputs the estimated savings, if suggested actions are implemented. In another embodiment, the optimal scheduler acts as an autonomous control unit, which takes independent control actions.

The present system may also incorporate a user persona (ex: user prefers comfort (comfort lover), user desires conservation of energy (tree hugger), budget conscious, etc.) which indicate the user preferences and goals of the home owners. Along with the user persona, the system iteratively estimates the modes of operation the home is in at any given point in time, based on user preferences and load eco-system states. The home may be in multiple modes (ex: Normal, Party, Vacation, office) at any given point in time and this system understands these modes. Each persona may have preferences under each mode, which is represented in terms of convenience of service (CoS). The 'convenience of service' can be directly provided in terms of crisp variables such as 'set points', 'time to complete task', 'Ready By HH Hours' etc. On other hand, the 'convenience of service' can be provided using fuzzy variables such as 'Comfortable', 'Energy saver', 'Cold', 'Hot' etc. The constraints engine generates the constraints set for each appliance and system based on CoS preferences.

The optimal scheduler 300 incorporates a hierarchical structure in capturing the user interaction, convenience of service, cost of operation, and the optimal load scheduling. A user persona level 310 includes for example several different personas of home owners or users such as Comfort Lover 311, Tree Hugger 312, Budget Conscious 313. The personas are used by optimal scheduler 300, and are indicative of the user preferences and goals. The next level is a mode level 315 that includes multiple modes of the home such as Normal 316, Party 317, and Vacation 318.

Each persona 310, may have preferences under each mode 315, which is represented in terms of convenience of service (CoS). The 'convenience of service' can be directly provided in terms of crisp variables such as 'set points', 'time to complete task', 'Ready By XX Hours' etc. On other hand, the 'convenience of service' can be provided using fuzzy variables such as 'Comfortable', 'Energy saver', 'Cold', 'Hot' etc. A constraints engine 320 generates the constraints set for each appliance (labeled A1, A2, A3 . . . AN) and system based on CoS preferences. For example, a refrigerator is constrained to operate in 'MAX-ICE after 7 PM' condition by constraints engine 320 for 'Comfort Lover' persona under 'Party Mode'. In one embodiment, the constraints may be stored as a table of parameter values such as set points for all of the appliances for each mode and each persona of each mode. The parameter values may be set by the system taking the persona and mode into account, may be modified by a user, or may be individually selected by the user in various embodiments.

A modeling engine 325 takes in to account the energy cost and set constraints to deduce the cost of operation and the associated time required for completion of tasks. In other words, a task may be generated by a scheduled mode as compared to a current context of the home. The modeling engine may then model different paths to modify the context of the home to match a desired state or context as defined by the mode and persona. The different paths may also take into account the personal of the user, such as achieving the desired context in the most economical manner, or in the most environmentally friendly manner, or in the most comfortable manner. The modeling engine 325 may thus model manner different appliances and systems in the home that will need to be used to obtain the desired mode and context of the home.

An optimization engine 330 incorporates the output of the modeling engine 325, and arrives at the state of each appliance and system at any given time, providing an optimal schedule 335 that takes into account at least the user persona, mode of operation, mode transition, CoS, and context of the home. A set of use cases may be used as examples to illustrate the usage of the context aware optimal scheduler.

EXAMPLE 1

A home owner instructed the controller 130 to ready the house for a party at 7 PM. The controller 130 maps the user persona, which is 'budget minder' and determines the logic/rule for optimizing the user preference and comfort conditions vis-à-vis the energy cost for the underlying home mode 'PARTY'. The constraint engine 320 generates the constraints for all the appliances and equipment. The constraints include the time parameters such as 'READY BY XX HOURS, for dish washer 'RETURN MODE AT XX PM' for HVAC, mode parameters such as 'MAX-ICE' for refrigerator, crisp parameters such as 'FLOW RATE' for pool pump during party, 'TEMPERATURE' and 'HUMIDITY' set points for HVAC etc. The modeling engine 325, which models the input-output behavior of each eco system or load in the home and simulates the behavior of the system, in particular, 'time to finish the commanded task', 'energy and dollar consumed for the commanded task'. This modules provides the intelligence required for the controller to schedule the operation. The optimization engine 330 determines the best 'cost function' to optimize based on user persona. In this particular example, the optimization engine lays large weight to the 'dollar conservation' and smaller weight to the 'comfort'. The optimization engine has additional inputs such as weather conditions, 'Time of Use' or ToU electricity price, 'user location' etc and performs series of permutations and combinations, which minimizes the dollar consumed and maximize the comforts. It also makes sure that the constraints determined by constraint engine 320 is satisfied. In one instance, the optimization engine 330 may suggest the following—1. Pool pump must be switched ON at 2 PM with a flow rate x1 till 4 PM'. 2. HVAC must pre-cool the house by 4:30 PM. Refrigerator must go to 'MAX-ICE' mode at 6 PM etc.

EXAMPLE 2

A home owner had programmed the thermostat (controller 130) for a particular week and instructed the thermostat to cool the home by 3 PM for the "RETURN" state. The home owner could not return by 3 PM and the HVAC was operating at RETURN state, which was consuming higher energy for keeping the comfortable temperature and humidity conditions. The optimal scheduler 300 analyzes the situation or context and detects the anomaly. An occupancy estimator detects that the home is not occupied and the optimal scheduler 300 sends the information to the home-owner/user regarding the anomaly. In one embodiment, the home-owner may instruct the scheduler remotely and the system reprograms the thermostat and resets the mode to 'AWAY' mode. In another embodiment, the optimal scheduler 300 resets the thermostat mode on its own and adjusts the thermostat settings appropriately.

EXAMPLE 3

A home owner is not happy with the electricity invoices recently received that are quite high. The home owner would like to understand. why the home is so energy consuming and how energy bills can be reduced. The home owner requests the system for a report on the energy usage for the last three months. The system 100 generates a detailed 'AS-IS' or context report on the energy usage by different appliances and systems, and after receiving the request, invokes modeling and the simulation engine which may be located locally or on a 'CLOUD/Server/Controller'. The system may simulate various scenarios. The system analyzes the outcome, and prepares a report on the energy usage pattern. The system further recommends actions to minimize the overall energy usage. The system may present a chart for energy savings and corresponding achievable comfort level. The system provides the user with energy analysis services without subscribing to a costlier web based energy services provided by external agencies.

EXAMPLE 4

On a week day, the system receives an hour in advance an alert about higher energy prices during peak hours. The optimal scheduler 300 would like to schedule the loads such that the overall energy cost is reduced without affecting the user's convenience. The system sends a request to the optimal scheduler 300 for an optimal schedule, which invokes its modeling/simulation engine and simulates various scenarios. Depending on the best scenario, the optimal schedule is communicated to the system. The optimal scheduler schedules different loads according to the optimal schedule, which may vary between different users depending on both the persona and mode.

EXAMPLE 5

On a Friday morning, a home user informs the system 100 of a possible party Friday evening. For the party mode, system ensures that the dishwasher cleans all dishes and makes them ready before the party begins. The optimal scheduler 300 ensures that the 'ICE' mode of a refrigerator is enabled. This process will make ice available part attendees. It also ensures that pool water is cleaned by starting a pool-pump at an appropriate time so that all attendees can use the pool without any hesitation. To ensure completion of the above tasks, the system requests the optimal scheduler to do the scenario analysis. The optimal scheduler in turn simulates various scenarios using its modeling and simulation engine 325 and calculates time for completion of different tasks for different appliances and systems. It also communicates associated energy consumption to the system. Depending on these parameters, the optimal scheduler schedules the dishwasher, refrigerator, pool-pump, and other appliances and systems to achieve a desired home mode at a desired time.

In some embodiments, the system 100 uses a set of measurements o assess the conditions and contexts prevailing at home. Measurements include, total energy consumption, equipment set points, ambient conditions, Load states (ON/OFF) and operating modes, demand response and time of use price signal, predicted loads etc. The optimal scheduler 300 is aware of the present state and expected state of the sources and loads in the future. The optimal scheduler 300 uses input from extensive modeling of the sources and loads. The optimal scheduler 300 uses existing contexts at the home for executing a set of control actions at any given point in time. In one embodiment, the optimal scheduler 300 may consider the predicted state at the home and accordingly schedule the appliances and equipments, keeping in mind the energy conservation and dollar savings.

In one example, a refrigerator may be constrained to operate in 'MAX-ICE after 7 PM' condition by constraints engine for 'comfort lover' persona under 'Party Mode'. The modeling engine 325 takes in to account the energy cost and set constraints to deduce the cost of operation and the associated time required for completion of the task. The optimal scheduler 300 incorporates the output of the modeling engine 325 and arrives at the state, of each appliance and system at any given time.

Figure 4:
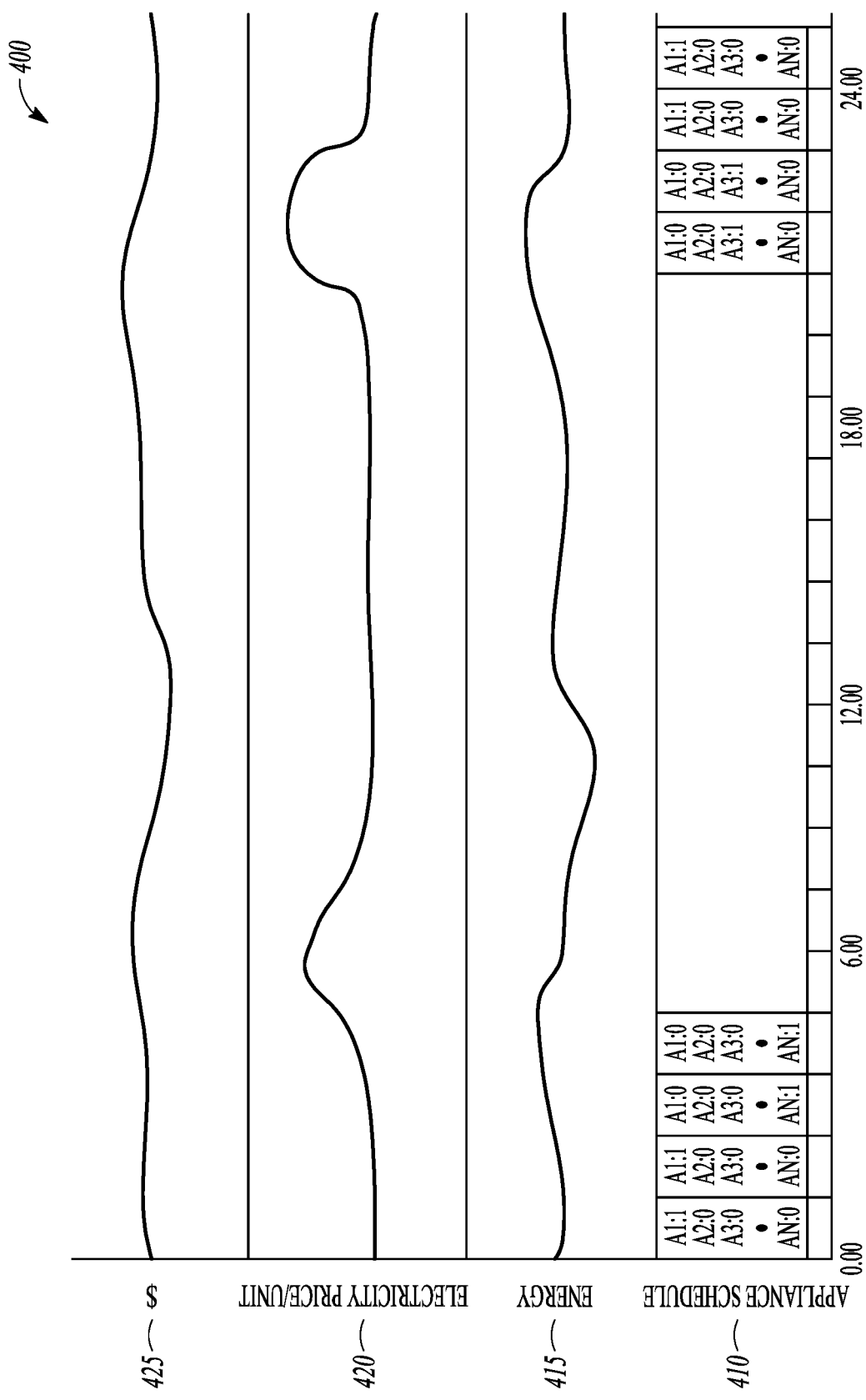
FIG. 4 is a graph illustrating a load scheduling instantiation according to an example embodiment.

FIG. 4 is a graph illustrating a load scheduling instantiation 400 according to an example embodiment. The horizontal axis illustrates a time passage of one day or 24 hours. The vertical access has several different parameters, including lists of appliances 410 with corresponding parameters, energy use 415 at the home meter level, energy price per unit 420, and cost of energy used 425. There are two conflicting objectives which are met by the optimal scheduler.

Minimize Cost of Energy
Maximize the CoS

In one embodiment, a simple and tractable cost function is used, namely 'minimizing the cost of energy'. The CoS aspect is incorporated as constraints in the optimization step. This is simple to implement and practical. Other approaches of varying complexity may also be used. One example cost function is set forth as follows:

$$J = \sum_{A=1}^{N} \sum_{M=1}^{J_A} \sum_{T_i=1}^{T_{MAX}} C_{T_i} E_{T_i}^{A,M} \delta(t = T_i)$$

A=App. No. (1 . . . N–number of appliances/apparatus)
Examples include but are not limited to: Dishwasher, clothes washer, water heater, pool pump etc.
A→Does not include HVAC and refrigerator
N=Total number of appliances
$C_{T_i}$=Cost of energy at discrete time interval $T_i, E_{T_i}^{A, M}$=
Energy required at discrete time interval $T_i$
$J_A$=Maximum number of modes for appliance A
$\delta(t=T_i)$=1 if t=$T_i$=0 otherwise Although a pool pump has a continuous flow rate, it is assumed that there are J modes (discrete modes) of flow rate. Arbitrary small discrete steps of flow rate can approximate the continuous flow rate of the pool pump, which can be easily implemented in computer.

The parameter of interest is Ti which is obtained for each appliance and equipment. Note that, the equipment and appliances (ex: HVAC, Refrigerator), which continuously operate need not be scheduled using the optimal scheduler in one embodiment.

Figure 5:
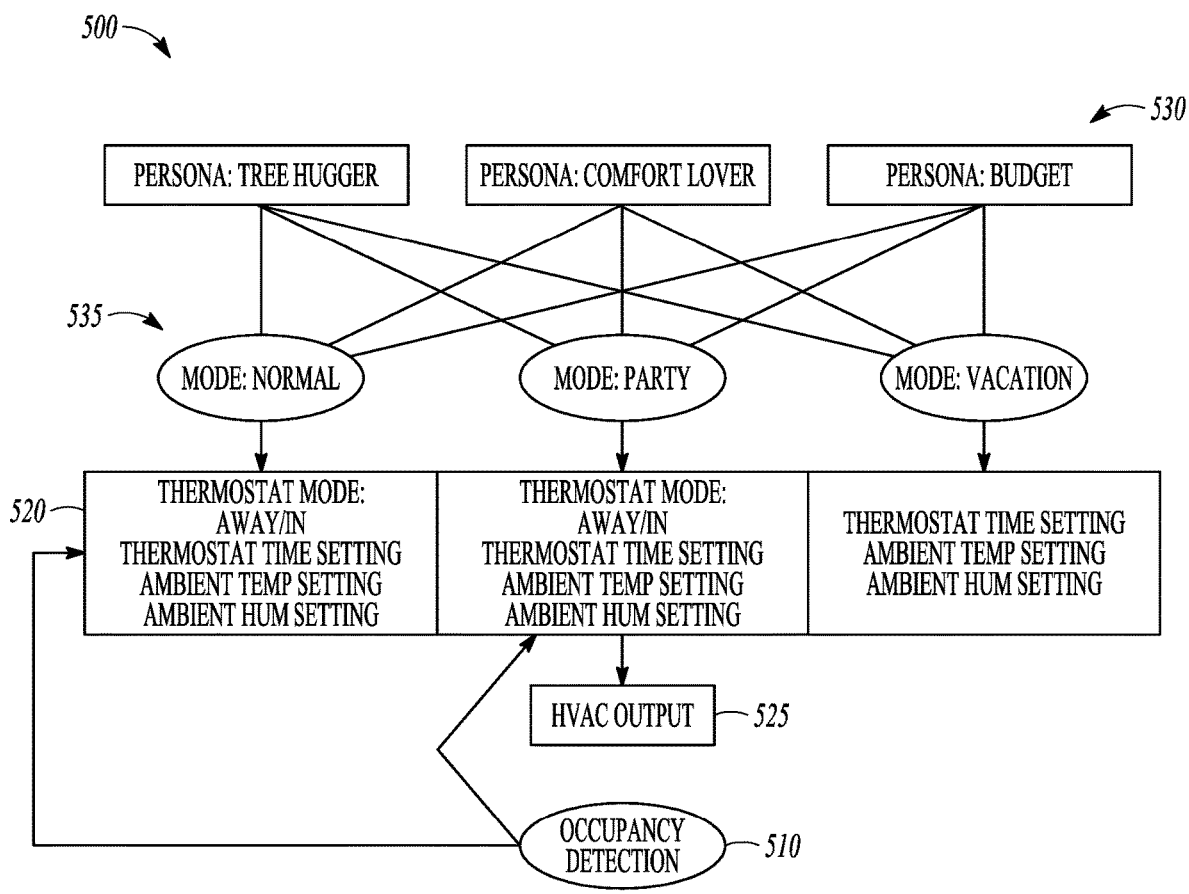
FIG. 5 is a block flow diagram illustrating HVAC control and occupancy detection according to an example embodiment.

In one embodiment illustrated in block form at 500 in FIG. 1, the optimal scheduler detects an anomaly between CoS preferences and actual state of the home. Under these conditions, the optimal scheduler undertakes appropriate actions based on a prevailing context and user inputs. In one embodiment, the optimal scheduler interacts with an occupancy detector 510 in FIG. 5, and analyzes thermostat settings 520 and actual occupancy in controlling an HVAC output 525. Persona 530 and mode 535 may also be taken into account. For example, the thermostat is programmed to RETURN mode at 15:00 Hrs, where as the occupancy detector 510 fails to detect the occupancy. In such a scenario, the optimal scheduler alerts the user and informs the user of the anomaly and changes a thermostat setting 520 to 'AWAY' mode.

Figure 6:
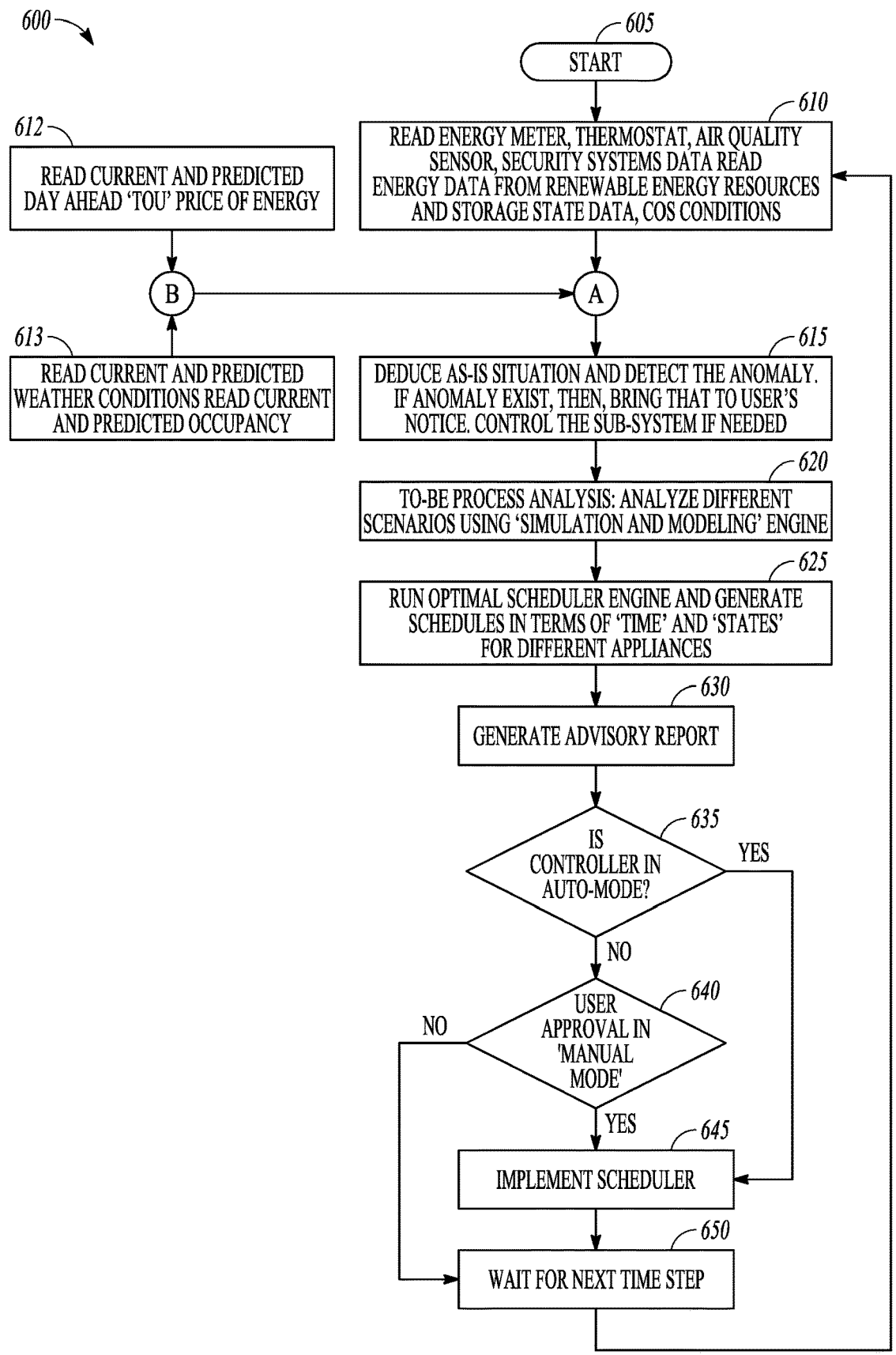
FIG. 6 is a flowchart illustrating a process for handling anomalies according to an example embodiment.

FIG. 6 is a flowchart illustrating a process 600 for handling anomalies according to an example embodiment. Process 600 starts at 605. At 610, the context of the home is obtained, including reading the energy meter, thermostat, air quality sensor, security system data, and energy data read from renewable energy resources and storage state data, as well as CoS conditions. Further information contributing the context of the home include the current and predicted data ahead TOU price of energy at 612 and current and predicted weather conditions and current and predicted occupancy at 613.

At 615, the context of the home or AS-IS situation is deduced and an anomaly is detected if it exists. If the anomaly is detected, then the user may be notified and a subsystem or appliance controlled if needed. At 620, a TO-BE process analysis is performed. Different scenarios are analyzed using the simulation and modeling engine. At 625, the optimal scheduler is run in terms of time and states for different appliances and systems. At 630, an advisory report including an optimal schedule may be generated.

At 635, the optimal schedule may be implemented by first checking whether the controller is in a auto-mode. If not, a check is made at 640 to determine if user approval is in manual mode. If yes, the scheduler is implemented at 645 to execute the optimal schedule and control appliances and systems. If either the controller was in auto-mode at 635, or not in manual mode at 640, a next time step is waited for at 650, upon which control returns to 610 and the context is determined again.

To perform simulation and analysis, mathematical models of the selected appliances such as HVAC system, pool-pump etc., may be used. The models capture features of interest like 'time to complete a particular task', 'energy consumption to complete that task', 'cost of energy to complete that particular task' etc. This report describes modeling of HVAC system, pool pump and ON-DEMAND appliances.

In one example, a pool pump may operate at different flow rates, which are related to time it takes to complete a task of cleaning the pool by filtering most or all of the, water in the pool. At a first flow rate, it may take two hours to clean the pool. At a second flow rate, it may take three hours to clean the pool, but may utilize less overall energy. Several different rates and or combinations of rates may be modeled over different time periods which may have different costs of energy. The results of the modeling are then provided to the optimization engine for selecting the schedule that best meets the needs and desires of the user by satisfying the schedule and persona.

HVAC System Modeling

A set point for an HVAC system is chosen according to external weather conditions, convenience of service and time-of-use utility price. Typically, an HVAC system is controlled by a thermostat according to a chosen set point. In a simple HVAC system, the thermostat activates a relay when the room temperature drops below the set point by a predetermined threshold. The relay is deactivated when the room temperature exceeds the set point by a predetermined threshold. When the relay is activated, the power is drawn from the utility. During deactivation, no power is drawn from utility.

Figure 7:
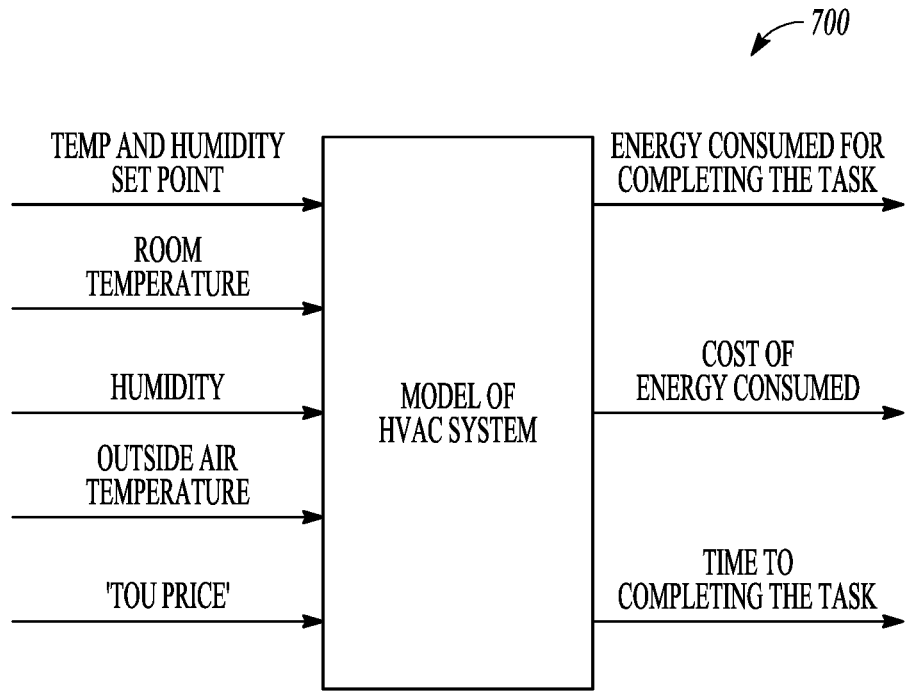
FIG. 7 is a block diagram of a model of an HVAC system according to an example embodiment.

The modeling provides a simple transfer function between energy required to change room temperature to the temperature set point. In one example approach, a state space model of HVAC system in the discrete domain may be used. A graphical representation of input-output model is shown in FIG. 7 at 700.

The model of HVAC captures time to complete state operation, energy required for completing this state transition and cost of energy for this transition. A state can be a change in temperature set-point. The following TABLE 1 summarizes input-output description.

TABLE 1

| Variable | Description | Remarks |
|---|---|---|
| INPUT | | |
| Setpoint | Set point for temperature and humidity | $T_S$ |
| Present room temp | Measured room temperature | $T_a$ |
| Outside temperature | Measured outside temperature | $T_o$ |
| Present humidity | Measured room humidity | |
| Real Time price | Available real time price of energy from utility | $C_{rtp}$ |
| OUTPUT | | |
| Time | Time to complete state operation | $t_{cso}$ |

TABLE 1-continued

| Variable | Description | Remarks |
|---|---|---|
| Energy | Energy consumption during state operation | $E_{HVAC}$ |
| Cost | Cost of energy during state operation | $C_Q$ |

The following difference equation is used to capture the temperature dynamics in the HVAC system.

$$T_a(k+1) = a_1 T_a(k) + a_2 T_o(k) + b T_S(K)$$

The energy required in this task is given by $$E_{HVAC}(k) = f_Q(T_a, T_S)$$

The associated cost of energy is given by $$C_Q = F_C(E_{HVAC}, C_{rtp})$$

The time to complete the task is calculated from the difference equation and expressed as follows:

$$t_{cso} = f_t(a_1, a_2, b, T_a, T_o, T_S)$$

Pool Pump Modeling

Recently, modern pool-pumps are driven by variable frequency drives (VFD). These VFD drives allows the user to select an appropriate water flow rate for a given head. In pool applications, significant energy and cost savings can be achieved by reducing the operating speed when the filters are clean, or when the pool is experiencing off-peak loads.

Figure 8:
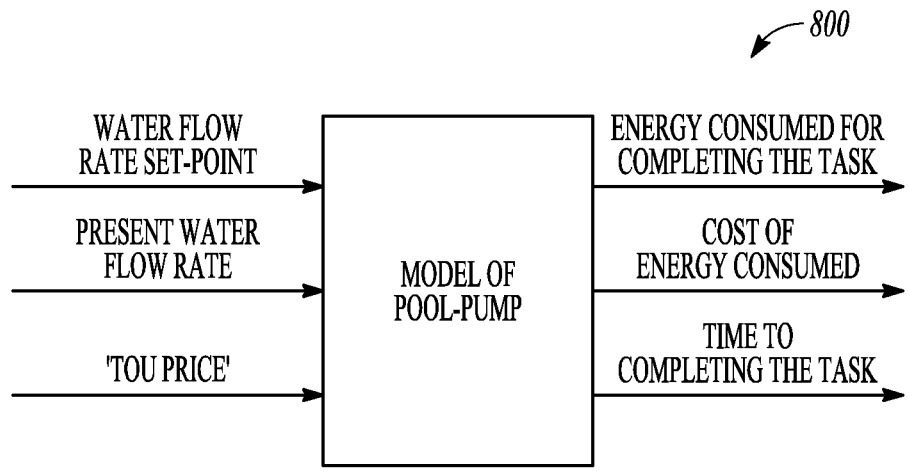
FIG. 8 is a block diagram of a model of a pool pump according to an example embodiment.

The aim of the modeling is to derive a simple transfer function between energy 'required to change water flow rate' and water flow rate set point. In our approach, we will develop a state space model of a pool-pump in the discrete domain. A graphical representation of input-output model is shown in FIG. 8 at 800.

The following TABLE 2 gives detailed description of Input-Output variables of pool-pump.

TABLE 2

| Variable | Description | Remarks |
|---|---|---|
| INPUT | | |
| Setpoint | % Set point for water flow rate in m³/s | $Q_{sp}$ |
| Present flow rate | Measured flow rate in in m³/s | Q |
| Real Time price | Available real time price of energy from utility in $ | $C_{rtp}$ |
| OUTPUT | | |
| Time | Time to complete state operation in sec | $t_{pump}$ |
| Energy | Energy consumption during state operation in wattSec | $E_{pump}$ |
| Cost | Cost of energy during state operation in $ | $C_{Qpump}$ |

The following difference equation captures pool-pump dynamics.

$$Q_{fl}(k+1) = a_3 Q_{fl}(k) + b_{pimp} Q_{zp}(K)$$

The energy required in this task is given by $$E_{pump}(k) = K Q_{fl}$$

The associated cost of energy is given by $$C_{Qpump} = F_{pump}(E_{pump}, C_{rep})$$

The time to complete the task can be calculated from the difference equation and expressed as follows:

$$t_{pump} = f_c(a_3, a_4, b_{pump}, Q_{ft}, Q_{zp})$$

Modeling of On-Demand Appliances

On-demand appliances such as washing machines, dish washers have pre-defined cycles/states. For example, a dish washer can have states/cycles like 'pre-wash-cycle', 'High-temperature scrub' etc. A refrigerator can have states like 'MAX-ICE', 'DEFROST' etc. All these states are preprogrammed with time 'to complete the task'. By measuring voltage and current for these appliances, it is possible to predict power and energy by assuming certain power factor. Hence, if the state of an appliance is known, then it is possible to determine time to complete state operation, energy required for completing this state transition and cost of energy for this transition. For this purpose, a look-up-table (LUT) is created.

In one embodiment, the LUT will have five elements: 'APPLIANCE', 'STATE', 'ENERGY CONSUMED', 'TIME REQUIRED TO COMPLETE' and 'COST OF ENERGY'. A typical look-up-table is shown in TABLE 3:

TABLE 3

| Appliance | STATE | Energy Consumption | COST of ENERGY | TIME to COMPLTE the OPERATION |
|---|---|---|---|---|
| DISH WASHER | 'PRE-WASH CYCLE' | 0.2 kwh | 0.4 cents | 1 hr |
| DISH WASHER | 'HIGH TEMPERATURE SCRUB' | 0.6 kwh | 1.2 cents | 1 hr |

The above LUT may be constructed for all on demand appliances. This LUT can be updated periodically to reflect current energy consumption and corresponding cost of energy. A learning algorithm may be used to capture changing energy consumption pattern of the appliance and can help in scheduling and diagnostics of appliance.

Figure 9:
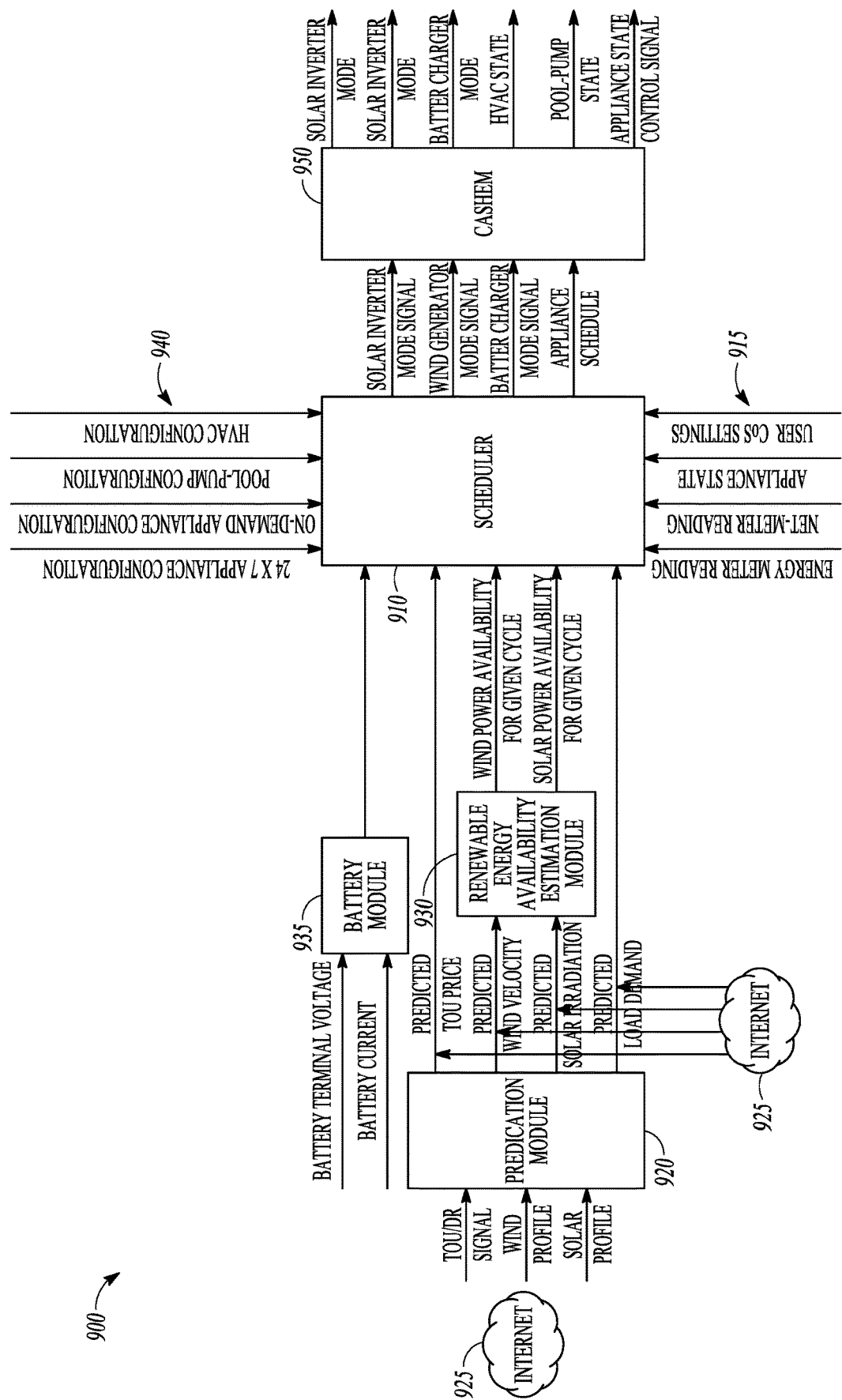
FIG. 9 is a control block diagram according to an example embodiment.

An overall framework and the process flow is shown FIG. 9 at 900. A scheduler 910 is coupled to a user CoS settings device, such as a remote control device 915. A prediction module 920 is coupled to the scheduler 910 and receives information from a net work or other information source such as the internet represented at 925. Information including ToU/DR signals, wind profiles, solar profiles and other information may be provided to enable the prediction model to predict ToU price, wind velocity, solar irradiation and load demand. Some of this information is provided direction to the scheduler 910 and some is provided to a renewable energy availability estimation module 930 to generate wind power availability and solar power availability for a given cycle or selected period of time.

A battery module 935 may receive battery terminal voltage information and battery current as inputs and provide state of charge (SOC) information to the scheduler 910. The scheduler may also receive energy meter readings, a net meter reading and various appliance and system states. A load configuration module 940 may be coupled to the scheduler 910 to provide configuration information, a part of the context of the home, for HVAC, pool pump, on demand appliances, and 24×7 appliances.

The scheduler may then use this information to provide control signals for the various energy collection devices and loads to a controller 950, which will then control the solar inverter module, wind inverter module, battery charger module, HVAC state, pool-pump state, and appliance state control signal among others.

Figure 10:
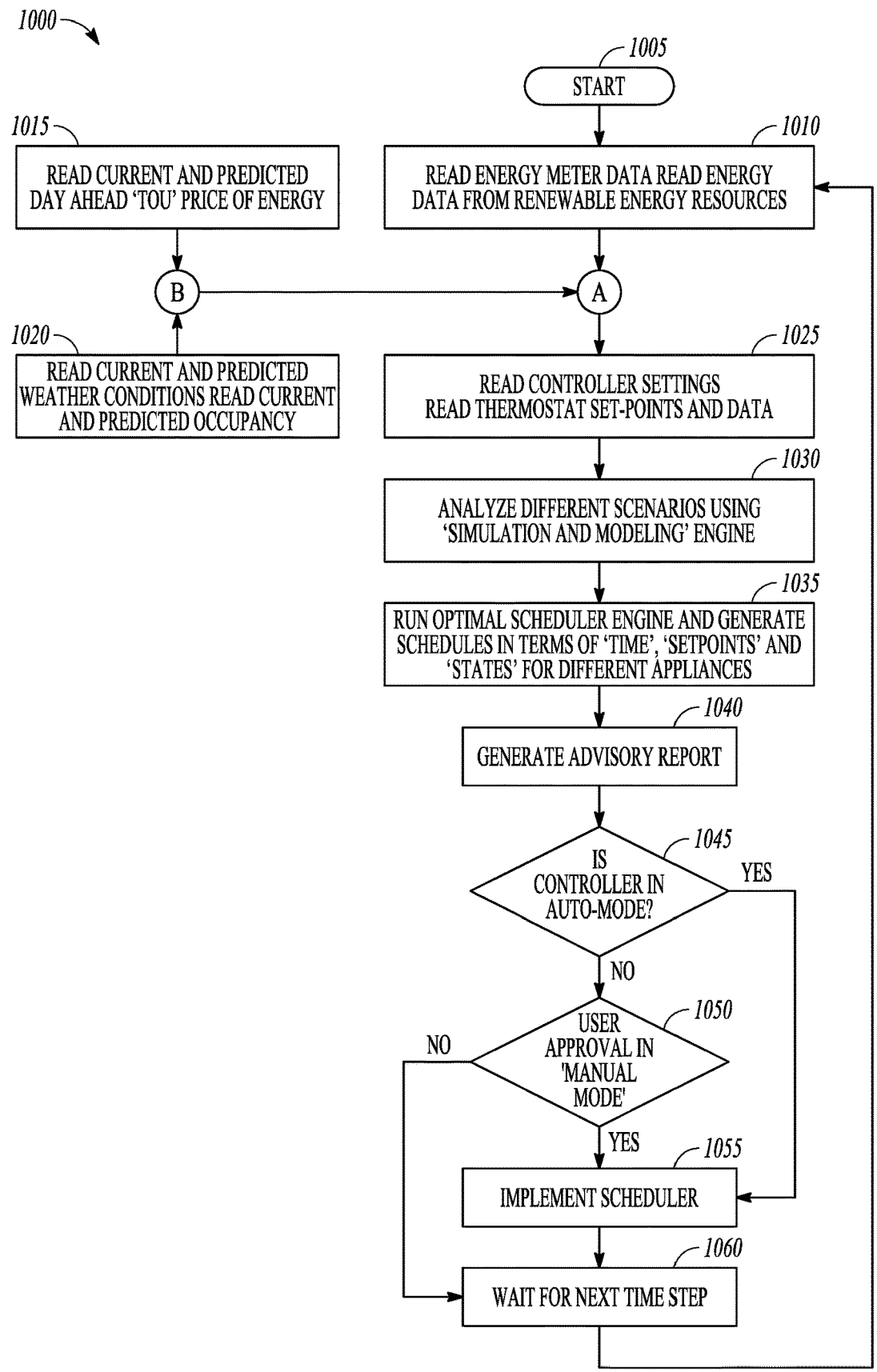
FIG. 10 is a flowchart illustrating a process for controller appliances and systems via an optimal scheduler according to an example embodiment.

FIG. 10 is a flowchart illustrating a process 1000 for controlling appliances and systems according to an example embodiment. Process 1000 starts at 1005. At 1010, the context of the home is obtained, including reading the energy meter, thermostat, air quality sensor, security system data, and energy data read from renewable energy resources and storage state data, as well as CoS conditions. Further information contributing the context of the home include the current and predicted data ahead TOU price of energy at 1015 and current and predicted weather conditions and current and predicted occupancy at 1020.

At 1025, controller settings are read, including thermostat set points and data. At 1030, different scenarios are analyzed using the simulation and modeling engine. At 1035, the optimal scheduler is run in terms of time, set points and states for different appliances and systems. At 10400, an advisory report including an optimal schedule may be generated.

At 1045, the optimal schedule may be implemented by first checking whether the controller is in an auto-mode. If not, a check is made at 1050 to determine if user approval is in manual mode. If yes, the scheduler is implemented at 1055 to execute the optimal schedule and control appliances and systems. If either the controller was in auto-mode at 1045, or not in manual mode at 1050, a next time step is waited for at 1060, upon which control returns to 1010 and the context is determined again.

Figure 11:
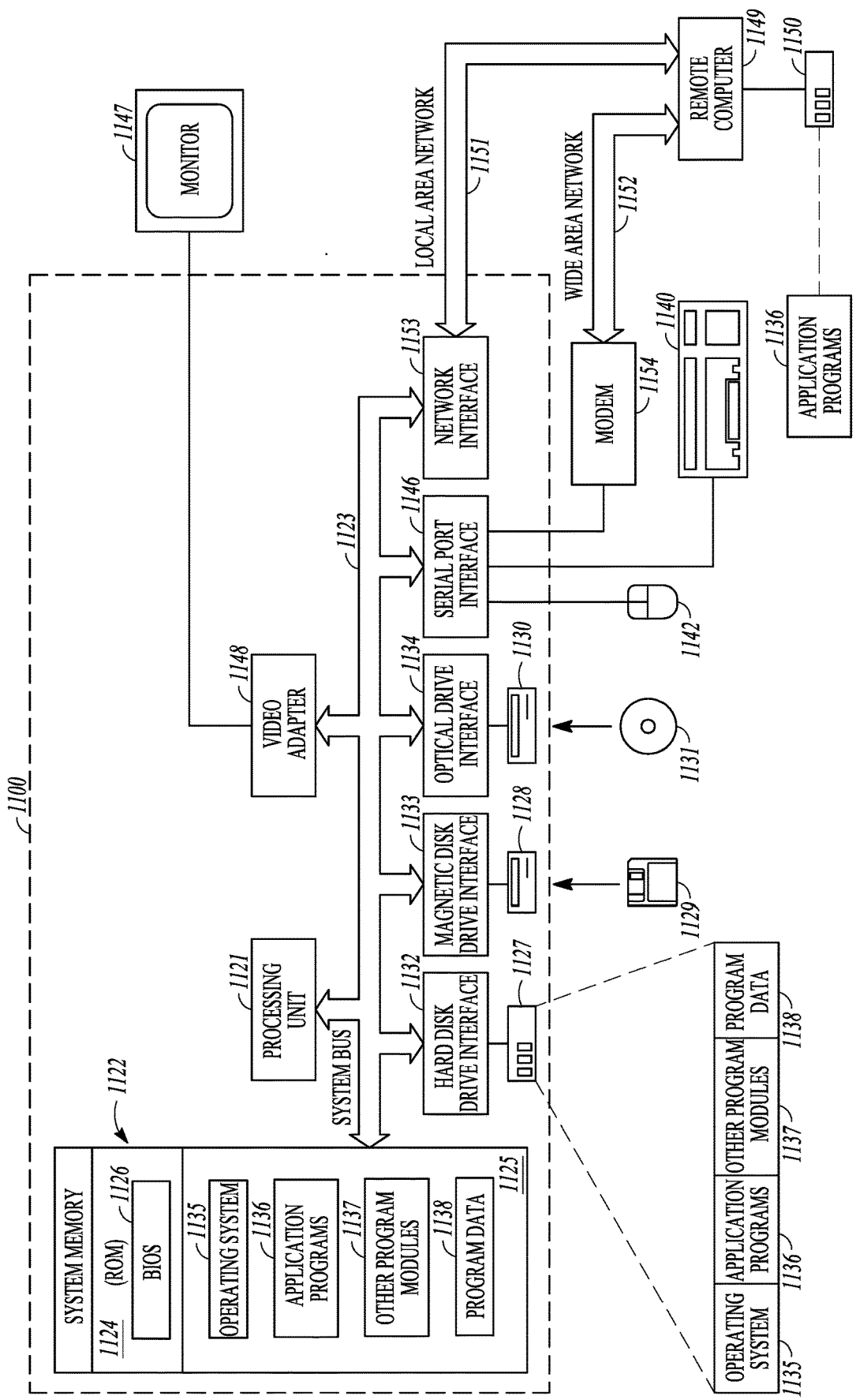
FIG. 11 is a block diagram of a computer system for implementing one or more components of a system according to an example embodiment.

FIG. 11 is a block diagram of a computer system to implement components of the system, including the optimal scheduler and modeling according to an example embodiment. In the embodiment shown in FIG. 11, a hardware and operating environment is provided that may be specifically programmed to implement the optimal scheduler and models described herein.

As shown in FIG. 11, one embodiment of the hardware and operating environment includes a general purpose computing device in the form of a computer 1100 (e.g., a personal computer, workstation, or server), including one or more processing units 1121, a system memory 1122, and a system bus 1123 that operatively couples various system components including the system memory 1122 to the processing unit 1121. There may be only one or there may be more than one processing unit 1121, such that the processor of computer 1100 comprises a single central-processing unit (CPU), or a plurality of processing units, commonly referred to as a multiprocessor or parallel-processor environment. In various embodiments, computer 1100 is a conventional computer, a distributed computer, or any other type of computer.

The system bus 1123 can be any of several types of bus structures including a memory bus or memory controller, a peripheral bus, and a local bus using any of a variety of bus architectures. The system memory can also be referred to as simply the memory, and, in some embodiments, includes read-only memory (ROM) 1124 and random-access memory (RAM) 1125. A basic input/output system (BIOS) program 1126, containing the basic routines that help to transfer information between elements within the computer 1100, such as during start-up, may be stored in ROM 1124. The computer 1100 further includes a hard disk drive 1127 for reading from and writing to a hard disk, not shown, a magnetic disk drive 1128 for reading from or writing to a removable magnetic disk 1129, and an optical disk drive 1130 for reading from or writing to a removable optical disk 1131 such as a CD ROM or other optical media.

The hard disk drive 1127, magnetic disk drive 1128, and optical disk drive 1130 couple with a hard disk drive interface 1132, a magnetic disk drive interface 1133, and an optical disk drive interface 1134, respectively. The drives and their associated computer-readable media provide non volatile storage of computer-readable instructions, data structures, program modules and other data for the computer 1100. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 1129, optical disk 1131, ROM 1124, or RAM 1125, including an operating system 1135, one or more application programs 1136, other program modules 1137, and program data 1138. Programming for implementing one or more processes or method described herein may be resident on any one or number of these computer-readable media.

A user may enter commands and information into computer 1100 through input devices such as a keyboard 1140 and pointing device 1142. Other input devices (not shown) can include a microphone, joystick, game pad, satellite dish, scanner, or the like. These other input devices are often connected to the processing unit 1121 through a serial port interface 1146 that is coupled to the system bus 1123, but can be connected by other interfaces, such as a parallel port, game port, or a universal serial bus (USB). A monitor 1147 or other type of display device can also be connected to the system bus 1123 via an interface, such as a video adapter 1148. The monitor 1147 can display a graphical user interface for the user. In addition to the monitor 1147, computers typically include other peripheral output devices (not shown), such as speakers and printers.

The computer 1100 may operate in a networked environment using logical connections to one or more remote computers or servers, such as remote computer 1149. These logical connections are achieved by a communication device coupled to or a part of the computer 1100; the invention is not limited to a particular type of communications device. The remote computer 1149 can be another computer, a server, a router, a network PC, a client, a peer device or other common network node, and typically includes many or all of the elements described above I/O relative to the computer 1100, although only a memory storage device 1150 has been illustrated. The logical connections depicted in FIG. 11 include a local area network (LAN) 1151 and/or a wide area network (WAN) 1152. Such networking environments are commonplace in office networks, enterprise-wide computer networks, intranets and the internet, which are all types of networks.

When used in a LAN-networking environment, the computer 1100 is connected to the LAN 1151 through a network interface or adapter 1153, which is one type of communications device. In some embodiments, when used in a WAN-networking environment, the computer 1100 typically includes a modem 1154 (another type of communications device) or any other type of communications device, e.g., a wireless transceiver, for establishing communications over the wide-area network 1152, such as the internet. The modem 1154, which may be internal or external, is connected to the system bus 1123 via the serial port interface 1146. In a networked environment, program modules depicted relative to the computer 1100 can be stored in the remote memory storage device 1150 of remote computer, or server 1149. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Load and source scheduling is desirable for energy conservation and dollar savings in a context aware home. The context aware home minimizes the energy consumption at home, without compromising the user's convenience of service. Hence, the Optimal scheduler (can also be called as control) assesses the condition at home and constantly looks-out for opportunities for energy conservation. In another embodiment, the Optimal scheduler strives to minimize the overall energy cost by optimizing the consumptions during time of use (ToU) pricing scenario. In another embodiment, the Optimal scheduler, attempt to maximize the user convenience by preparing the home as per user instruction. In one embodiment, the control set up the home for a party which is scheduled at certain time by the user. In another embodiment, the control system maximizes the usage of renewable energy and takes optimal decisions on usage of utility grid power. In another embodiment, the control system maximizes the revenues generated by the renewable energy sources. In another embodiment, control system prepares the home for a possible "VACATION" mode, wherein the home is unoccupied for few days followed by a RETURN mode, wherein it prepares the home for optimal/comfortable living.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A controller for controlling energy consumption in a home, the controller comprising:
   a constraints engine to define sets of constraints for multiple appliances in the home corresponding to various home modes, convenience of service, and persona of an occupant of the home;
   a modeling engine to model multiple paths of energy utilization of the multiple appliances to place the home into a desired state from a current context;
   an optimal scheduler to receive the multiple paths of energy utilization, to generate a schedule as a function of the multiple paths and a selected persona with corresponding sets of constraints to place the home in a desired state, and to suggest a plurality of load schedules and set points for optimal energy conservation; and
   an occupancy module to determine whether or not the home is currently occupied;
   wherein the occupancy module infers occupancy from an overall energy utilization signature, wherein the optimal scheduler automatically resets at least one thermostat mode of the home and automatically adjusts at least one thermostat setting of the home, in response to the occupancy module determining that the home is not occupied; and wherein the controller correlates and maps fuzzy data to parameters that are used for scheduling and controlling operation of home loads.

2. The controller of claim 1 wherein the constraints engine comprises variables for each appliance and subsystem under each mode.

3. The controller of claim 2 wherein the home modes include a normal mode, a party mode, and a vacation mode.

4. The controller of claim 1 wherein the persona is indicative of a user high level preferences and goals.

5. The controller of claim 4 wherein the user high level preference and goals include at least one of optimal energy conservation, dollar saving and comfort conditions.

6. The controller of claim 1 wherein the current context of the home includes weather conditions, present state, expected states of sources and loads, and time of use price signal.

7. The controller of claim 1 wherein the controller is driven by anomaly detection.

8. The controller of claim 1 wherein the controller is driven by difference between the desired state and the current context of the home.

9. The controller of claim 1 wherein the modeling engine includes a model of heating ventilation and air conditioning (HVAC) that captures time to complete state operation, energy required for completing this state transition and cost of energy for this transition.

10. The controller of claim 1 wherein the modeling engine includes a look up table for an appliance that describes state, energy consumption, cost of energy, and time to complete an operation.

11. The controller of claim 1, comprising a cost function engine operable to analyze, for all appliances and for all modes of each appliance, a cost of energy at a discrete time interval.

12. The controller of claim 1, wherein the modeling engine models a plurality of different rates and combinations of rates for the multiple appliances in the home, the plurality of different rates and combinations of rates having a plurality of costs of energy.

13. The controller of claim 12 wherein the plurality of different rates and combinations of rates comprises flow rates of a pool pump.

14. A method for controlling energy consumption in a home, the method comprising:

modeling multiple paths of energy utilization of multiple appliances via a specifically programmed computer to place a home in a desired state from a current context, wherein the appliances have variables selected as a function of home modes and home occupant persona, the method comprising:

receiving the multiple paths of energy utilization via the computer;

generating a schedule via the computer for control of the appliances as a function of the multiple paths and a selected persona to place the home in the desired state, wherein the schedule suggests a plurality of load schedules and set points for optimal energy conservation;

inferring occupancy from an overall energy utilization signature; and correlating and mapping fuzzy data to parameters that are used for scheduling and controlling operation of home loads, wherein at least one thermostat mode of the home is automatically reset and at least one thermostat setting of the home is automatically adjusted, in response to the home being determined not occupied.

15. The method of claim 14 wherein the home modes include a normal mode, a party mode, and a vacation mode, and wherein the persona is indicative of a user preferences and goals.

16. The method of claim 14 and further comprising detecting occupancy of the home, and modifying a thermostat mode based on an anomaly between the detected occupancy and an expected occupancy.

17. The method of claim 16 wherein occupancy is inferred from an overall energy utilization signature.

18. The method of claim 14 wherein the current context of the home includes weather conditions, present state, expected states of sources and loads, and time of use price signal.

19. A computer readable storage device having instructions to cause a computer to execute a method for controlling energy consumption in a home, the method comprising:

modeling multiple paths of energy utilization of multiple appliances via a specifically programmed computer to place a home in a desired state from a current context, wherein the appliances have variables selected as a function of home modes and home occupant persona;

receiving the multiple paths of energy utilization via the computer;

generating a schedule via the computer for control of the appliances as a function of the multiple paths and a selected persona to place the home in a desired state, wherein the schedule suggests a plurality of load schedules and set points for optimal energy conservation;

inferring occupancy from an overall energy utilization signature; and correlating and mapping fuzzy data to parameters that are used for scheduling and controlling operation of home loads;

wherein at least one thermostat mode of the home is automatically reset and at least one thermostat setting of the home is automatically adjusted, in response to the home being determined not occupied.

20. The computer readable storage device of claim 19 wherein the method further comprises detecting occupancy of the home, and modifying a thermostat mode based on an anomaly between the detected occupancy and an expected occupancy, wherein occupancy is inferred from an overall energy utilization signature.

* * * * *